June 14, 1927.

C. D. BOURCIER 1,632,166

IGNITION TESTING DEVICE FOR INTERNAL COMBUSTION ENGINES

Filed June 20, 1923

Inventor
Charles D. Bourcier
By Owen W. Kennedy
Attorney

Patented June 14, 1927.

1,632,166

UNITED STATES PATENT OFFICE.

CHARLES D. BOURCIER, OF GRAFTON, MASSACHUSETTS.

IGNITION-TESTING DEVICE FOR INTERNAL-COMBUSTION ENGINES.

Application filed June 20, 1923. Serial No. 646,582.

My invention relates generally to a device for use in connection with the ignition system of an internal combustion engine, and more particularly to a testing device for use in connection with the multiple cylinder engine of an automobile, aeroplane, or other vehicle.

The object of my invention is to provide an improved testing device of the above described character, whereby the spark plugs of different cylinders of the engine may be individually tested at a point convenient for the operator while the engine is running, in order to determine whether the several spark plugs are properly receiving ignition current, and also to determine whether or not the spark plugs themselves are functioning properly. My improved device is so arranged that each cylinder can be separately tested in full view of the operator without interfering with the normal operation of the engine, and while the vehicle is in motion.

The above and other advantageous features of my invention will hereinafter more fully appear, reference being had to the accompanying drawings, in which Fig. 1 is a diagrammatic view illustrating the application of my improved testing device to an internal combustion engine.

Like reference characters refer to like parts in the different figures.

Figure 1:
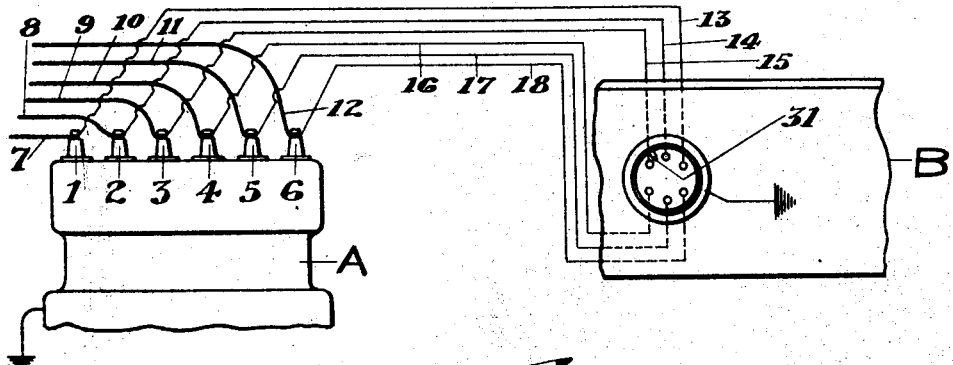

Referring first to Fig. 1, the cylinder block of an internal combustion engine is indicated at A, and for the purpose of illustration the block A is shown as comprising six cylinders provided with spark plugs 1, 2, 3, 4, 5 and 6, although it is to be understood that my device can be used in connection with an engine having any other desired number of cylinders. The spark plugs have connected thereto ignition cables 7, 8, 9, 10, 11 and 12, inclusive, leading from a suitable distributor, not shown, whereby ignition current is supplied to the plugs 1 to 6, inclusive, in proper sequence for the firing order of the engine. As is customary in most internal combustion engines, the cylinder block A is grounded, and the spark in each cylinder is obtained by the current jumping to ground across the gap G between the spark plug points, as clearly shown in Fig. 3.

Figure 2:
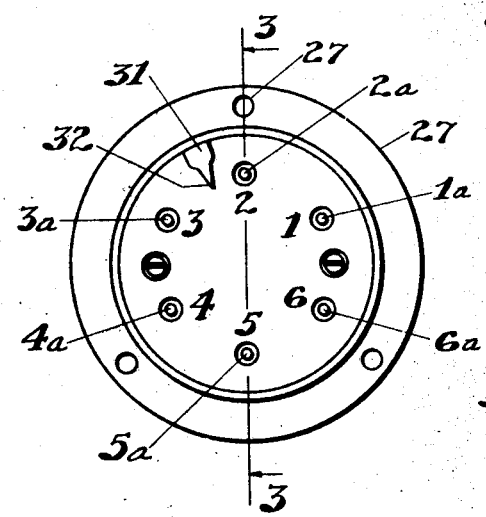
Fig. 2 is a view in front elevation of my device.

A portion of the instrument board B of an automobile or other vehicle is illustrated in Fig. 1, as having been turned at right angles to its usual position with respect to the engine, and my improved testing device is shown as being mounted on the board B, although it may as well be mounted at other places on the vehicles, as may be desired. A plurality of testing wires 13, 14, 15, 16, 17 and 18, inclusive, lead from the spark plugs 1, 2, 3, 4, 5 and 6, respectively, to a testing device which will now be described with reference to Figs. 2, 3 and 4.

My improved device consists generally of a base 19 composed of suitable insulating material, such as hard rubber or fibre, and provided with a plurality of circumferentially arranged openings 20, extending therethrough. The number of openings 20 correspond to the number of spark plugs, and testing terminals $1^a$, $2^a$, $3^a$, $4^a$, $5^a$ and $6^a$ are arranged in openings 20 in the same order as the spark plugs, the terminal $1^a$ being connected to the plug 1 by the wire 13, the terminal $2^a$ being connected to the plug 2 by the wire 14, and so on. The several terminals $1^a$ to $6^a$, inclusive, project beyond the rear face of the base 19 and the projecting portions are received in openings 21, provided in a block 22, also of insulating material, which is secured to the base 19. The several wires 13 to 18, inclusive, are provided at their ends with plugs 23 of a well known type which are received in recesses 24 provided in the testing terminals $1^a$ to $6^a$, inclusive, whereby the several terminals may be conveniently connected to their respective spark plugs.

The block 22 is received in an opening 25 provided in the board B and the opening 25 is surrounded by an annular plate 26 of conducting material. The plate 26 is grounded to the frame of the vehicle by any suitable means, such as the screws 27 which secure the plate 26 to the board B. The plate 26 is engaged by a ring 28 of conducting material which is turnable on a reduced cylindrical portion 29 of the base 19, a flange 30 preventing lateral movement of the ring 28. The ring 28 carries a testing pointer 31 which extends beyond the flange 30 and is bent over parallel to the face of the base 19.

The end of the pointer 31 is tapered and is of such length that when the ring 28 is turned on the base 19, the tip 32 of the pointer 31 is adapted to pass successively directly in front of the terminals 1ª to 6ª, inclusive.

Figure 3:
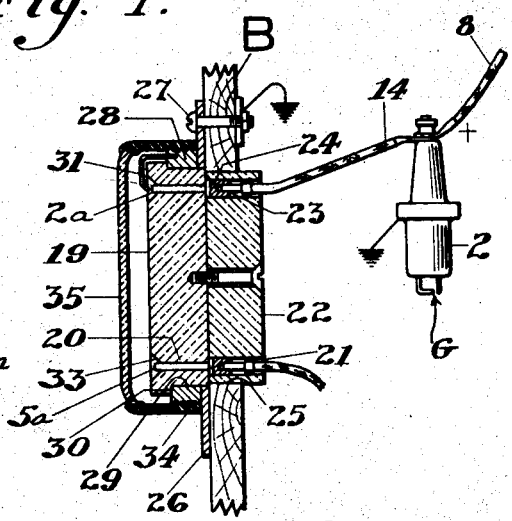
Fig. 3 is a transverse sectional view along the line 3, 3, of Fig. 2, looking in the direction of the arrows.
Figure 4:
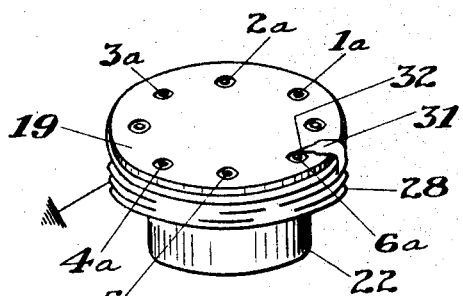
Fig. 4 is a perspective view showing the testing base and finger removed from the device.

As best shown in Figs. 3 and 4, the openings 20 are countersunk, as indicated at 33, and the several testing terminals 1ª to 6ª, inclusive, terminate within the countersunk portions 33 slightly below the face of the base 19. When the pointer 31 is positioned directly over a testing terminal, its tip 32 is substantially in engagement with the terminal.

The ring 28 is surrounded by a cylindrical casing 34, preferably composed of insulating material, which casing is in threaded engagement with the ring and carries a circular glass 35 which completely encloses the testing terminals and the movable pointer, so as to protect them and keep out the dust and dirt. The casing 34 being secured on to the ring 28, provides a member which may be readily taken hold of by the fingers for the purpose of turning the ring 28 and the pointer 31.

Having thus described the various parts entering into my invention, the operation thereof is as follows. When the engine is operating properly, the pointer 31 is normally left in a neutral position intermediate any pair of adjacent testing terminals, such as 2ª and 3ª, so that the distance between the tip 32 and these points is so great as to preclude any possibility of a discharge. In order to insure against any premature functioning of my testing device when the engine is running properly, I have purposely located the terminals 1ª to 6ª inclusive, well within the countersunk portions 33 to prevent a discharge between adjacent terminals, and have furthermore disposed the connectors between the terminals 1ª to 6ª inclusive, and the wires 13 to 18, inclusive, well within the openings 21 in the block 22.

When it is desired to test the ignition system of the engine, in the event that a miss in the firing is noticeable, the operator has only to take hold of the casing 34 and turn the same slowly in either direction. Turning of the casing 34 causes the pointer 31 to move therewith in the direction of one of the testing terminals 1ª to 6ª, inclusive. As the pointer 31 approaches a terminal, such as 3ª, a discharge will take place if ignition current is being properly supplied to the spark plug 3, and if such is the case, the pointer is then moved toward the next testing terminal 4ª and the test repeated. If a discharge occurs between the pointer 31 and each of the testing terminals 1ª to 6ª, the driver may then be assured that ignition current is being supplied to each of the spark plugs 1 to 6, and that the trouble does not lie in the distributor, or in any of the spark plug cables 7 to 12, inclusive. If, however, a discharge is not obtained at any of the terminals 1ª to 6ª, inclusive, then the driver will immediately know that the trouble lies either in a faulty ignition cable or in the distributor itself. In other words, by moving the pointer 31 successively to the testing terminals 1ª to 6ª, inclusive, the trouble is immediately localized.

Assuming that the operator has determined that ignition current is being supplied to all of the spark plugs 1 to 6, inclusive, and that the firing of the engine is still irregular, his next step is to determine which of the several cylinders is not firing properly. When making this test the pointer 31 is moved very slowly toward the terminal being tested, and when the discharge occurs, the driver carefully notices whether the firing of the engine is substantially the same as before, or whether there appears to be another cylinder missing. If the discharge, at any particular terminal, results in increasing the misfiring, then the driver may conclude that the cylinder being tested is firing properly, inasmuch as the discharge to the pointer 31 shortcircuits the plug in question, and causes that particular cylinder to also miss. If, however, the discharge from a particular testing terminal occurs without increasing the misfiring, then the operator may conclude that while the corresponding spark plug is properly receiving ignition current, the plug itself may be faulty. The suspected plug may then be removed and inspected, for either an accumulation of carbon or oil on its points, or for improper spacing of its discharge points. If upon replacing this plug it is found that the trouble has not been remedied, then the operator must look elsewhere for the cause.

It also happens sometimes that the ignition current supplied to a particular spark plug is of such low potential as to reduce the intensity of the spark produced by the plug, in which case the cylinder will fire irregularly, depending upon the load upon the engine. When such is the case, my improved testing device is particularly well adapted to locate the "weak" cylinder. When making a test for the intensity of the spark of any particular cylinder, the pointer 31 is moved very slowly toward the terminal in question and the position of the pointer when a discharge occurs is closely noted. If the ignition current is of low intensity the discharge will not occur until the tip 32 is very close to the testing terminal, and this fact will serve to indicate that the proper ignition current is not being supplied to the spark plug in question, due to either a faulty ignition cable or distributor.

From the foregoing, it is apparent that by my invention I have provided an extremely effective device for testing the ignition system of an internal combustion engine.

I claim:

1. In an ignition testing device, a base composed of insulating material, a plurality of testing terminals mounted in said base, a metallic ring rotatably mounted on said base, a testing pointer connected to said ring, and a casing composed of insulating material attached to and entirely surrounding said ring, whereby to turn said ring and said pointer by manipulation of said casing.

2. In an ignition testing device, a base composed of insulating material, a plurality of testing terminals mounted in said base, a metallic ring rotatably mounted on said base, a testing pointer connected to said ring, an annular casing composed of insulating material attached to and entirely surrounding said ring, and a glass front received by said annular casing, whereby said ring and pointer may be turned by manipulation of said casing without the operator under any condition receiving any shock.

Dated this 8th day of June, 1923.

CHARLES D. BOURCIER.